United States Patent
Zakonov

(10) Patent No.: US 7,707,588 B2
(45) Date of Patent: Apr. 27, 2010

(54) SOFTWARE APPLICATION ACTION MONITORING

(75) Inventor: Alex Zakonov, Manchester, CT (US)

(73) Assignee: Avicode, Inc., Baltimore, MD (US)

( * ) Notice: Subject to any disclaimer, the term of this patent is extended or adjusted under 35 U.S.C. 154(b) by 753 days.

(21) Appl. No.: 11/070,933

(22) Filed: Mar. 2, 2005

(65) Prior Publication Data

US 2005/0198649 A1   Sep. 8, 2005

Related U.S. Application Data

(60) Provisional application No. 60/549,441, filed on Mar. 2, 2004.

(51) Int. Cl.
 *G06F 3/00* (2006.01)
 *G06F 11/00* (2006.01)
 *H03M 13/00* (2006.01)

(52) U.S. Cl. .......................... 719/318; 714/48; 714/758

(58) Field of Classification Search ................. 719/318, 719/310; 717/127; 714/48, 758
See application file for complete search history.

(56) References Cited

U.S. PATENT DOCUMENTS

| | | | | |
|---|---|---|---|---|
| 5,687,182 A * | 11/1997 | Shikakura | ................... | 714/774 |
| 6,467,052 B1 * | 10/2002 | Kaler et al. | ................... | 714/39 |
| 6,537,228 B1 * | 3/2003 | Lambert | ..................... | 600/506 |
| 6,714,976 B1 * | 3/2004 | Wilson et al. | .............. | 709/224 |
| 7,224,686 B1 * | 5/2007 | Doskow et al. | ............. | 370/352 |
| 2003/0195997 A1 * | 10/2003 | Ibert et al. | .................. | 709/318 |
| 2004/0250261 A1 * | 12/2004 | Huibregtse | ................. | 719/318 |

* cited by examiner

*Primary Examiner*—Lechi Truong
(74) *Attorney, Agent, or Firm*—Steven M. McHugh

(57) ABSTRACT

A method for collecting runtime information generated by an active software application is provided wherein the method is implemented by a computer and includes identifying an occurrence of a function event generated for a software application operating on a predetermined platform, collecting the runtime information responsive to a function event, determining the duration of the function event, comparing the duration with a predetermined threshold value and processing the function information responsive to the comparing of the duration.

16 Claims, 7 Drawing Sheets

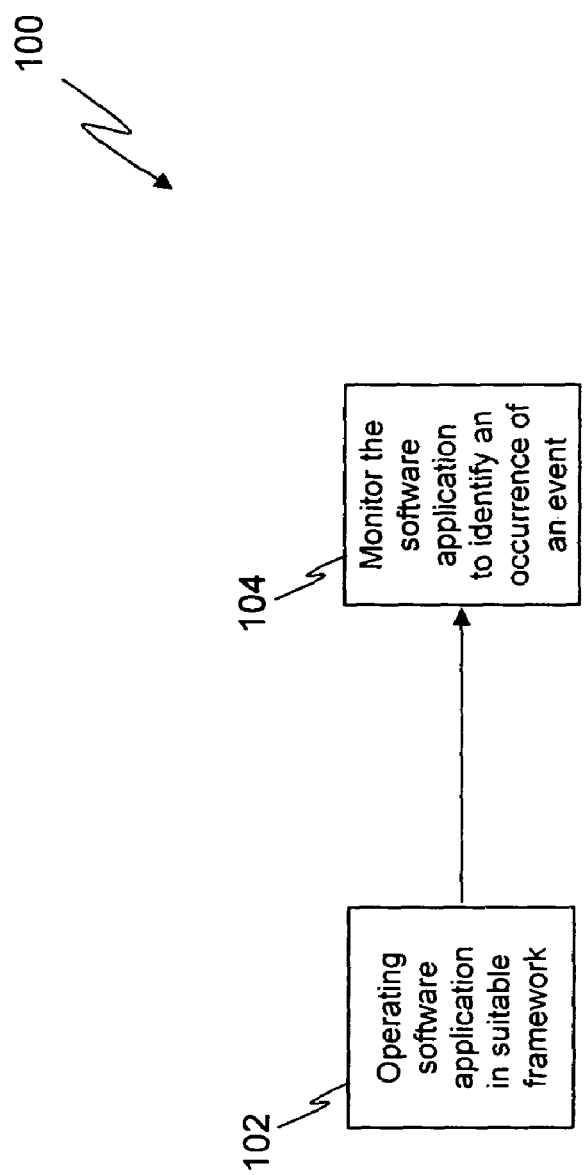

SOFTWARE APPLICATION ACTION MONITORING

RELATED APPLICATIONS

This Application claims priority of U.S. Provisional Patent Application No. 60/549,441 filed Mar. 2, 2004, the contents of which are hereby incorporated by reference herein.

FIELD OF THE INVENTION

This invention relates generally to software performance and more particularly to the collection and monitoring of information related to resource level actions.

BACKGROUND OF THE INVENTION

Application performance is one of the components that contribute to overall software quality. As such, different types of diagnostic tools have been developed to help diagnose, analyze and improve application performance. Most of these tools collect extensive information about the application performance for pre-production usage in development, test, or staging environments and include application code profilers, stress load simulators, database profilers and others. Unfortunately, however while pre-production performance analysis is crucial, it typically does not address all performance related issues. For example, consider the situation of a typical modern application that consists of multiple application components interacting with each other. Two factors that may contribute to the performance of each application component include the execution time of the application component code itself and the time spent on resource requests for external application components and systems, such as relational databases, LDAP resources, web services and others.

The execution time of the component code typically has a predictable dependency on the execution environment and the application state and as such, typically may be optimized in the development and/or the test environment. On the other hand, the resource request execution time varies greatly depending upon the resource state and the application environment. In fact, in many cases it is very hard or nearly impossible to emulate a real production state on a test platform or a staging platform. One example of such a situation involves a database driven system with a high volume of data that is too large and/or expensive to replicate on a test platform. Other examples involve software applications that rely on external Web services, wherein the external Web services are not controlled by the development team and as a result, cannot be properly stress tested.

For these types of situations, it is desirable to monitor and collect information relating to the performance of the application in the production environment. The production environment puts specific requirements on monitoring tools. One of these requirements involves a proper balance between the performance information collected and the overhead introduced by a monitoring tool. For this reason, a monitoring tool should be able collect enough information to facilitate discovery of a performance problem's root cause while introducing a minimal amount of disturbance to the production system. Another requirement involves the ability to detect application performance problems at the application action level and the ability to correlate the application performance with heavy resource requests to provide the root cause for application performance degradation.

SUMMARY OF THE INVENTION

A method for collecting runtime resource information generated by an active software application is provided wherein the method includes identifying an occurrence of a function event generated for a software application operating on a predetermined platform, determining the duration of the function event, comparing the duration with a predetermined threshold value and processing the function information responsive to the comparing of the duration.

A system for operating a software application in a predetermined platform, wherein the system includes machine-readable computer program code including instructions for causing a controller to implement a method for collecting runtime resource information generated by an active software application is provided wherein the method includes identifying an occurrence of a function event generated for a software application operating on a predetermined platform, determining the duration of the function event, comparing the duration with a predetermined threshold value and processing the function information responsive to the comparing of the duration.

A machine-readable computer program code, the program code including instructions for causing a controller to implement a method for collecting runtime resource information generated by an active software application is provided, wherein the method includes identifying an occurrence of a function event generated for a software application operating on a predetermined platform, determining the duration of the function event, comparing the duration with a predetermined threshold value and processing the function information responsive to the comparing of the duration.

BRIEF DESCRIPTION OF DRAWINGS

The foregoing and other features and advantages of the present invention will be more fully understood from the following detailed description of illustrative embodiments, taken in conjunction with the accompanying drawings in which like elements are numbered alike in the several Figures:

FIG. 1A is a block diagram illustrating one embodiment of an overall method for monitoring and collecting runtime resource information generated by an active software application, in accordance with an exemplary embodiment.

DETAILED DESCRIPTION OF THE INVENTION

It should be appreciated that the embodiment(s) described hereinbelow define at least one type of function for monitoring, wherein the monitored function may include application level actions. Application level actions typically correspond to actions produced by an application consumer, such as a user or other system(s) that may use services provided by the application. Typical examples of application level actions are web page requests, web service calls and handler events for a user interface control. Another type of monitored function may include resource interface calls. Resource interface calls are functions that provide a synchronous interface for an external resource, such as a relational or object database, file system, LDAP resource, web service, or any other type of data provider.

It should be further appreciated that the embodiment(s) described hereinabove may define a set of thresholds that control runtime data collection from the monitored functions. These thresholds may include alerting threshold(s) and sensitivity threshold(s), wherein the alerting threshold typically applies to application level actions and may define when an alert containing information about an action may need to be generated. Alerting thresholds may be set for all actions in an application, for a type of action, or for a specific action. Examples of setting the threshold for action types may include settings thresholds for web page calls, web service calls and for UI control event handlers. Examples of setting the threshold for a specific action may include setting thresholds for a specific web page or specific web method. Sensitivity thresholds typically apply to resource interface calls and may define when runtime information about a call needs to be collected and included into an application level action alert. These thresholds may be used for providing minimum overhead to a monitored application and may be defined for all resource interface calls in an application and for a specific resource interface call(s).

Figure 1B:
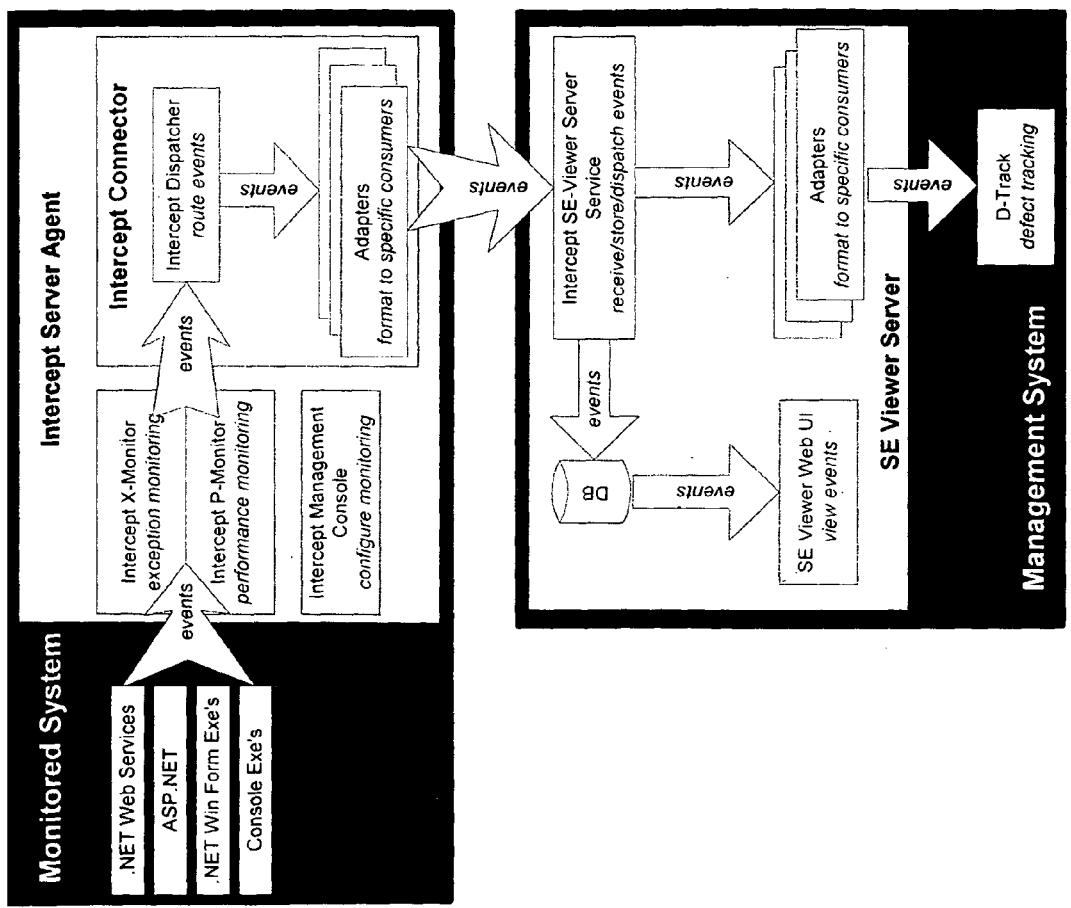
FIG. 1B is a block diagram illustrating one embodiment of an architecture for implementing the method for monitoring and collecting runtime resource information generated by an active software application illustrated in FIG. 1A.

Referring to FIGS. 1A and 1B, a block diagram illustrating a method 100 for monitoring and collecting runtime resource information generated by an active software application is shown and includes operating a software application in a suitable framework, as shown in operational block 102. The function of the software application is monitored to identify the occurrence of an event generated by an active software application, as shown in operational block 104. It should be appreciated that runtime information may be collected and an analysis of the threshold(s) may be performed via an Enter Event (EE) and a Leave Events (LE) for the monitored functions, wherein the leave events may include normal completion of a function and/or a termination of a function due to an exception event. It should also be appreciated that attachment to those events may be implemented using instrumentation or monitoring APIs of the application runtime environment.

Figure 2:
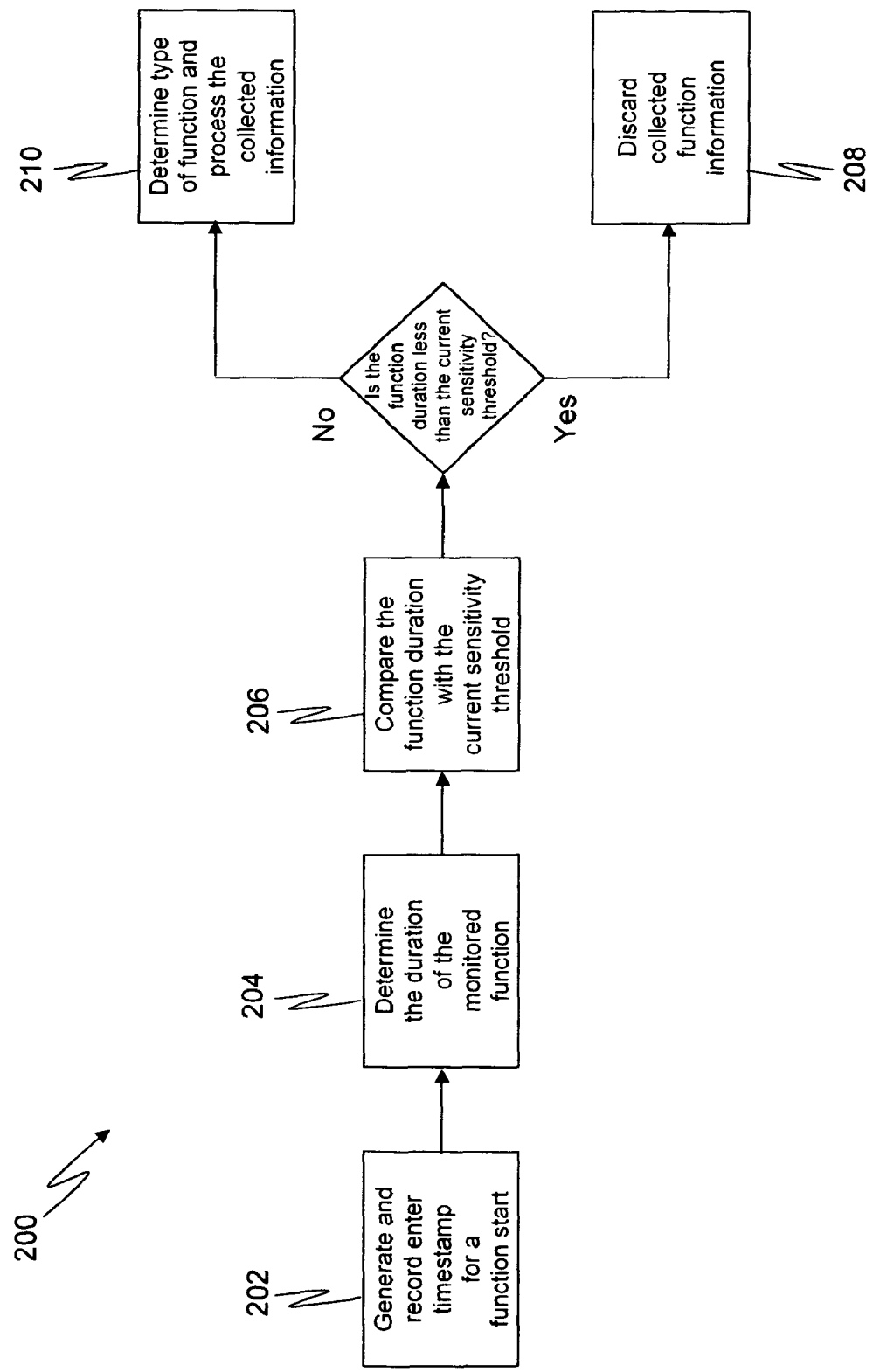
FIG. 2 is a block diagram illustrating one embodiment of the method of FIG. 1A.

Referring to FIG. 2, a block diagram 200 illustrating one embodiment for collecting information is shown and discussed. During an EE for a monitored function, an enter timestamp for the function start is generated and recorded, as shown in operational block 202. In a similar fashion, during an LE, the duration of the function is determined, as shown in operational block 204. This may be accomplished by generating a leave timestamp for the termination of the function and calculating the duration using the enter timestamp and/or the leave timestamp. Once the duration of the function has been determined, the duration may then be compared against the current sensitivity threshold, as shown in operational block 206. If the function duration is less than the sensitivity threshold, then the collected function information may be discarded, operational block 208. Otherwise, if the function duration is equal to or greater than the sensitivity threshold, then the type of function is determined, as shown in operational block 210, and the collected information is processed responsive, at least in part, to the function type.

Figure 3:
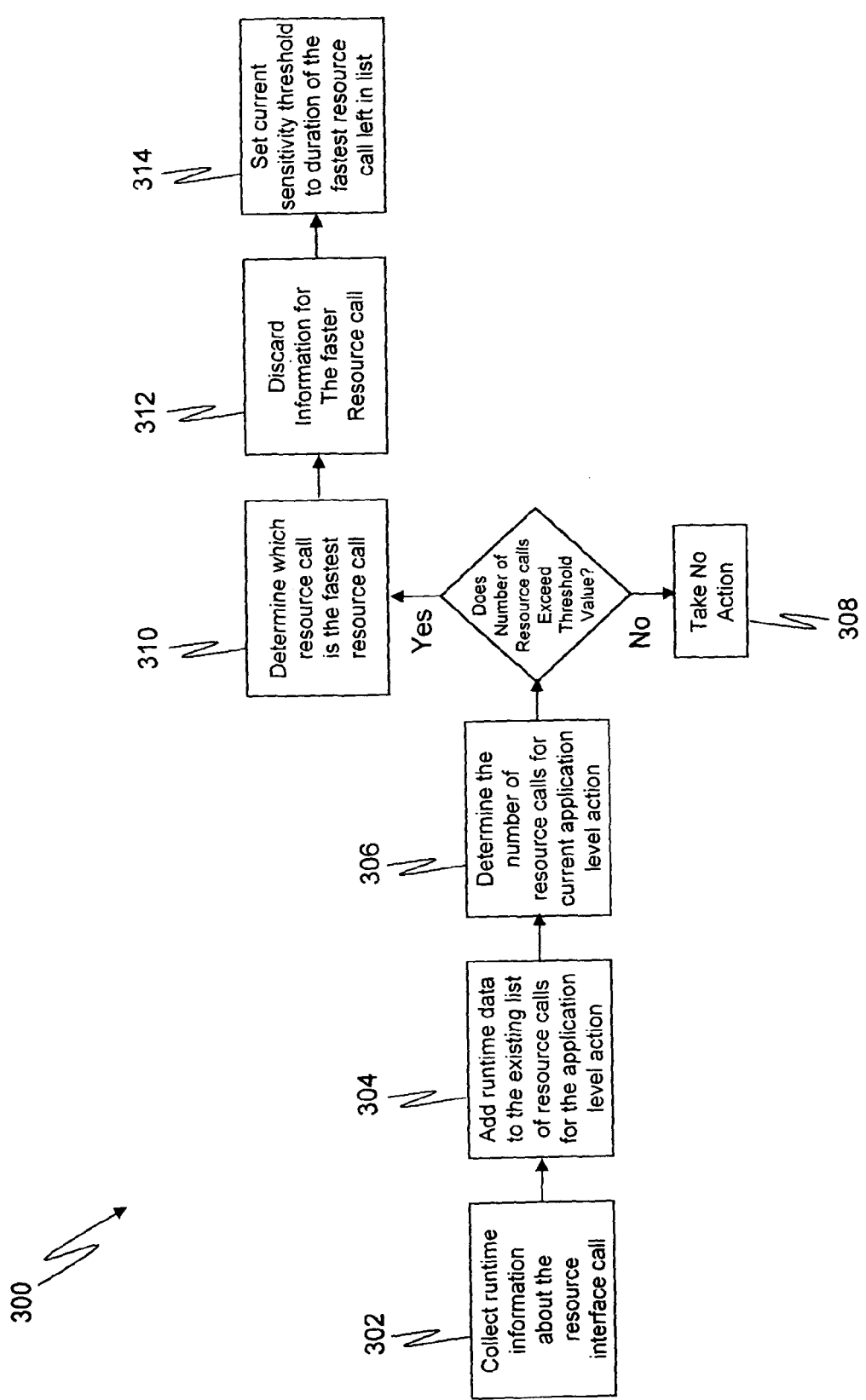
FIG. 3 is a block diagram illustrating one embodiment of the method of FIG. 1A.

Referring to FIG. 3, a block diagram 300 illustrating one embodiment for processing collected information responsive to a Resource Interface Call function type, as shown in operational block 210, is shown and discussed. If the function type is a resource interface call then the runtime information about the resource interface call is collected from the function parameters and member variables, as shown in operational block 302. The runtime data is added to an existing list of resource calls for the current application level action on the current thread, as shown in operational block 304, and the number of resource calls for the current application level action is determined, as shown in operational block 306. If the number of resource calls do not exceed a predetermined "threshold" value, then no action is taken, as shown in operational block 308. However, if the number of resource calls do exceed the predetermined "threshold" value, then the set of resource calls is examined to determine which resource call is the fastest resource call, i.e. which resource call has the shortest duration time, as shown in operational block 310. The information about the fastest resource call is discarded, as shown in operational block 312, and the current sensitivity threshold may be set to the duration of the fastest resource call left in the list of resource calls, as shown in operational block 314.

Figure 4:
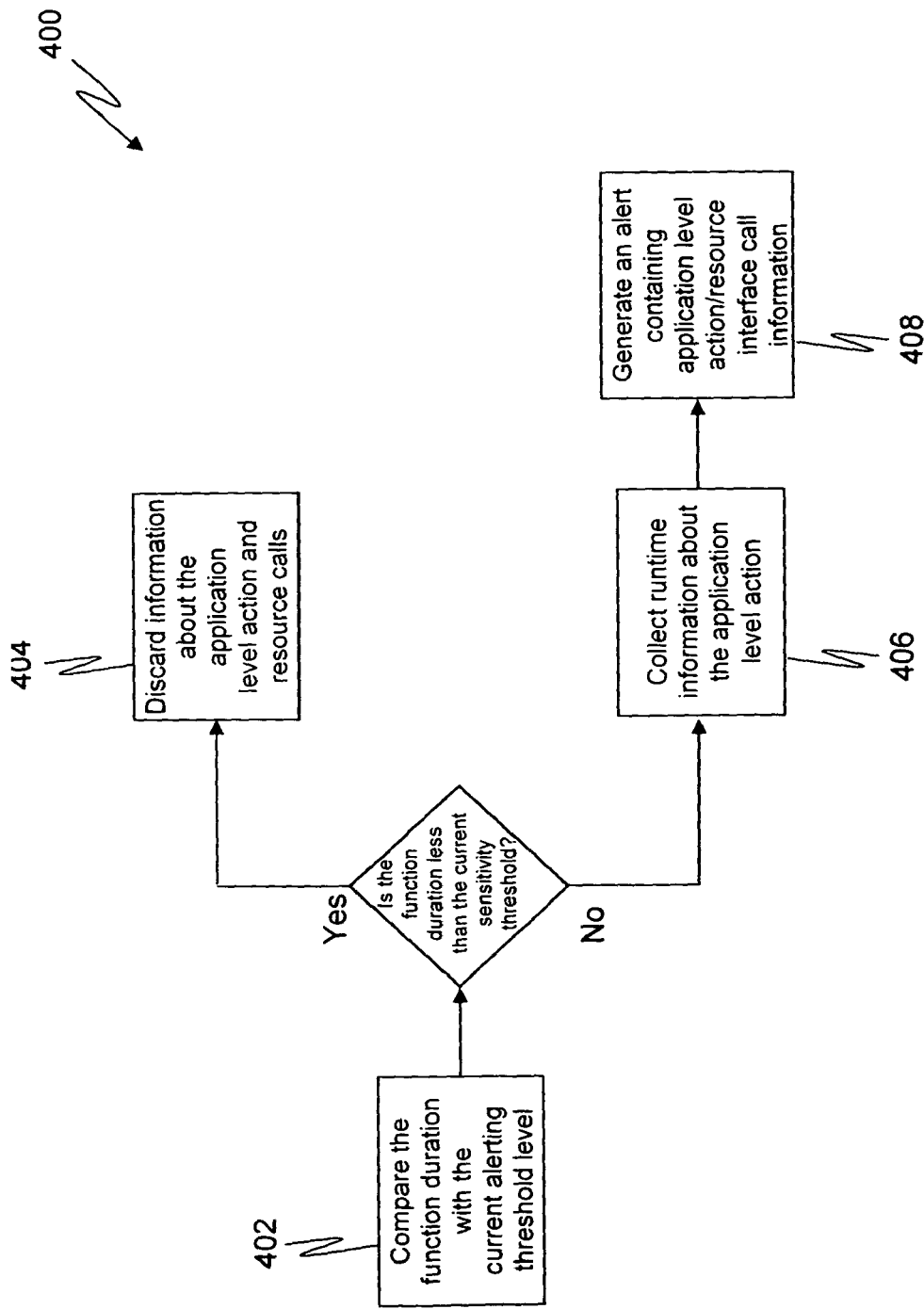
FIG. 4 is a block diagram illustrating one embodiment of the method of FIG. 1A.

Referring to FIG. 4, a block diagram 400 illustrating one embodiment for processing collected information responsive to an Application Level Action function type, as shown in operational block 210. If the function type is an application level action function type then the duration of the function is compared with the current alerting threshold level, as shown in operational block 402. If the duration of the function is less than the alerting threshold level, then information about the application level action and the resource calls for this function is discarded, as shown in operational block 404. However, if the duration of the function is equal to or greater than the alerting threshold level, runtime information about the application level action is collected, as shown in operational block 406, and an alert containing the application level action information and resource interface call information may be generated, as shown in operational block 408. It should be appreciated that although runtime information about the application level action is collected from the parameters and member variables, any method for collecting and/or generating runtime information about the application level action suitable to the desired end purpose may be used.

It should be appreciated that method 100 discussed herein allows for the monitoring and collection of root cause information of application level hot-spots in an application operating in a production environment with a minimal impact on application performance. It should also be appreciated that although method 100 is discussed herein in the context of a software application which seamlessly integrates into the .NET framework to provide a rich Application Programming Interface (API) for customization purposes and that is compatible with Windows Management Instrumentation (WMI), method 100 may be used in any context and/or platform suitable to the desired end purpose. Furthermore, it should be appreciated that method 100 may be integrated with third party operation management and issue tracking systems, such as Microsoft Operating Manager (MOM), Tivoli, BMC and HP OpenView, by either direct integration or by using intermediary integration techniques.

Figure 5:
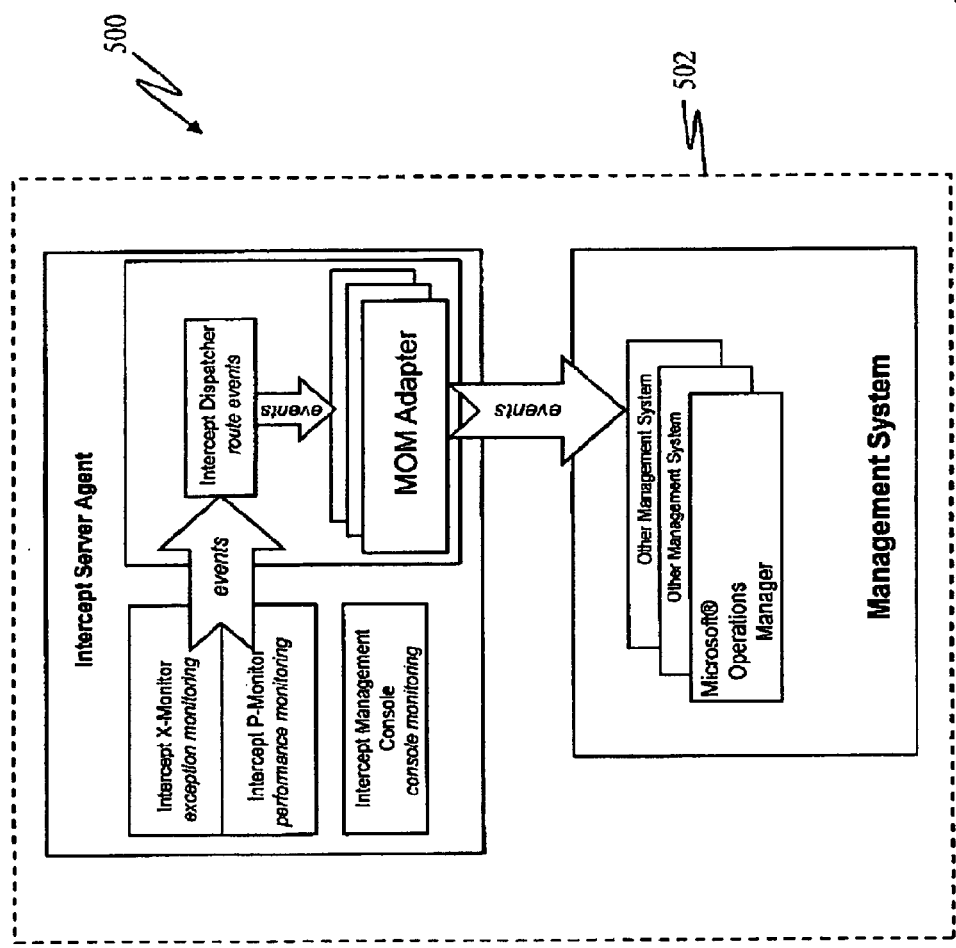
FIG. 5 is a block diagram illustrating a direct integration approach for implementing the method of FIG. 1A.

Referring to FIG. 5, a block diagram 500 illustrating a direct integration approach 502 is shown wherein the method 100 assumes that a third party management system takes full responsibility for exception events, including event delivery, event storage, event consolidation, event visualization and event interpretation. Moreover, the method 100 relies on a software intercept connector which includes an event dispatcher and multiple connector adapters. When it is determined that an exception event has occurred, the intercept monitor software application reports the event to an event dispatcher. The event dispatcher routes the event to the appropriate consumer's event class and event source, wherein connector adapters may be responsible for communications between the event dispatcher and the event consumers. As such, the connector adapters may remove the dependency between the event dispatcher and the event consumers to allow multiple event consumers to be supported. The connector adapters may include, but are not limited to, SE-Viewer adapter, WMI adapter and Windows event log adapter. It should be appreciated that the WMI adapter may also enable communication with any WMI compatible operations management system.

Figure 6:
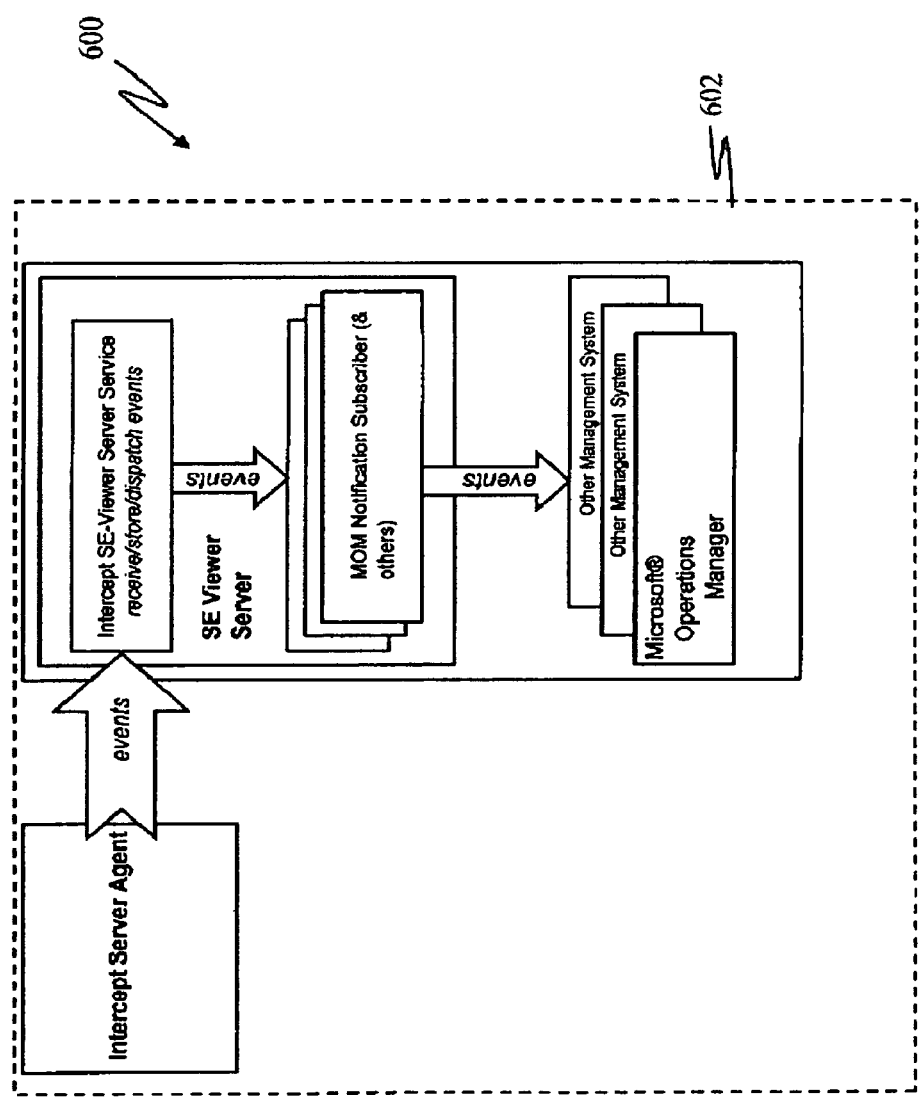
FIG. 6 is a block diagram illustrating an indirect integration approach for implementing the method of FIG. 1A using an SE-Viewer as an intermediary.

Referring to FIG. 6, a block diagram 600 illustrating an indirect integration approach 602 is shown, wherein the integration approach is using an SE-Viewer intermediary between the method 100 and a third party management system. In this approach, the requirements for a third party event management system may be simpler than in the direct approach 502 since the intermediary performs tasks such as event delivery, event storage, event visualization and event interpretation. It should be appreciated that the third party management system may be responsible for managing links to the events. It should also be appreciated that the SE-Viewer integration relies on an event notification mechanism, which may, or may not be, provided by the SE-Viewer server. When the SE-Viewer server receives an exception event, a notification is sent to SE-Viewer subscribers, wherein the SE-Viewer provides a standard API for developing notification subscribers. The current list of subscribers may include Windows Event Log notification, WMI notification and e-mail notification. The Windows Event Log and WMI notifications may be, or may not be, intended for integration with a third party network operation management system(s). In this case, the SE-Viewer server may be responsible for the initial event delivery, event storage and event visualization. Additionally, the third party operation management system may hold a link to the event stored in the SE-Viewer server.

It should be appreciated that the method 100 of FIG. 1 may collect additional information including the call stack, function parameters, local variables and object variables. Additionally, users may easily adjust the level of detail to limit the alerts to specific transactions, locations and/or groups.

As described above, the method 100 of FIG. 1, in whole or in part, may be embodied in the form of computer program code containing instructions wherein, when the computer program code is loaded into and executed by a computer, the computer becomes an apparatus for practicing the invention. As such, the method 100 of FIG. 1, in whole or in part, may be embodied in the form of computer-implemented processes and apparatuses for practicing those processes. The method 100 of FIG. 1, in whole or in part, may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the invention. The method 100 of FIG. 1 may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

It should be appreciated that method 100 described hereinabove may be implemented with any platform suitable to the desired end purpose, such as a .NET, a J2EE, a J2SE and/or a J2ME platform. Moreover, it should be appreciated that method 100 described hereinabove allows for the collection of resource specific runtime information about performance hot spots in the context of application level actions with minimal impact on application performance. The information may be collected by monitoring application runtime environment such as Microsoft CLR, Java virtual machine, or any other application execution environment. This monitoring may be achieved using monitoring APIs, which may or may not be, provided by the runtime environment or automatic code instrumentations. Additionally, code instrumentation may be performed at runtime or at compile time.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for collecting runtime information generated by an active software application, the method, implemented by a computer, comprising:

identifying, on the computer, an occurrence of a function event generated for a software application operating on a predetermined platform;

collecting, on the computer, the runtime information generated by the active software application responsive to said function event, wherein collecting includes:

determining a duration of said function event by calculating the duration using an enter timestamp for the function event and an end timestamp for the function event, wherein the duration is a time difference between said enter timestamp and said end timestamp, wherein the enter timestamp is generated and recorded;

comparing said duration with a predetermined threshold value to determine if said duration exceeds said predetermined threshold value; and if the duration is less than the predetermined threshold value, then the collected runtime information is discarded;

if the duration is equal to or greater than the predetermined threshold value, then a function event type is determined and the collected runtime information is processed, wherein processing includes:

collecting the runtime information about said function event based on the function event type, and adding the runtime information to a list of resource calls for application level actions, wherein said application level actions includes at least one of a Web page request, a web service call, a handler event for a user interface control or an application function and wherein said runtime information includes at least one of a value of a function parameter and a value of an object member variable, and wherein said function event type includes at least one of a Resource Interface Call function type and an Application Level Action function type.

2. The method of claim 1, wherein said predetermined platform includes at least one of a .NET framework platform, a J2EE platform, a J2SE platform and a J2ME platform.

3. The method of claim 1, wherein said identifying an occurrence includes monitoring said software application to detect said function event occurrence.

4. The method of claim 1, wherein when said function event is terminated, said determining includes generating a leave timestamp and determining said duration responsive to at least one of said enter timestamp and said leave timestamp.

5. The method of claim 1, wherein if said function event type is said Resource Interface Call function type, said processing includes collecting said runtime information about said function event.

6. The method of claim 1, wherein said processing further includes determining quantity of resource calls in said list of resource calls.

7. The method of claim 6, wherein said processing further includes determining whether said quantity of resource calls exceed a predetermined threshold value.

8. The method of claim 7, wherein if said quantity of resource calls does exceed said predetermined threshold value, said processing further includes identifying a fastest resource call and a second fastest resource call in said list of resource calls.

9. The method of claim 1, wherein if said function event type is said Application Level Action function type, said processing includes comparing said duration of said function event with a current alerting threshold level.

10. The method of claim 9, wherein if said duration of said function event is less than said current alerting threshold level, discarding information collected regarding said application level action and said resource calls.

11. The method of claim 10, wherein if said duration of said function event is at least one of greater than and equal to said current alerting threshold level, processing further includes collecting said runtime information about said application level action.

12. The method of claim 11, wherein said processing further includes generating an alert containing at least one of application level action information and resource interface call information.

13. A method for collecting runtime information generated by an active software application, the method implemented by a computer comprising:

identifying on the computer an occurrence of a function event generated for a software application operating on a predetermined platform;

collecting on the computer the runtime information responsive to said function event, wherein collecting includes determining duration of said function event;

comparing said duration with a predetermined threshold value to determine if said duration exceeds said predetermined threshold value; and processing said runtime information responsive to said comparing said duration, wherein said runtime information includes information responsive to a reason for said duration exceeds said predetermined threshold value, wherein said function duration is at least greater than and equal to said predetermined threshold value and wherein said processing further includes, determining function event type, wherein said function event type includes at least one of a Resource Interface Call function type and an Application Level Action function type, wherein if said function event type is said Resource Interface Call function type, collecting said runtime information about said function event;

adding said runtime information to a list of resource calls for application level actions, determining quantity of resource calls in said list of resource calls, determining whether said quantity of resource calls exceed a predetermined threshold value, and identifying a fastest resource call and a second fastest resource call in said list of resource calls if said quantity of resource calls does exceed said predetermined threshold value;

discarding information for said fastest resource call and setting said predetermined threshold valve to a duration of said second fastest resource call in said list of resource calls.

14. A system having a computer configured to implement a method for collecting runtime information generated by an active software application, the system comprising:

the computer having a controller for implementing the method comprising:

identifying on the computer an occurrence of a function event generated for a software application operating on a predetermined platform;

collecting on the computer the runtime information generated by the active software application responsive to said function event, wherein collecting includes:

determining a duration of said function event by calculating the duration using an enter timestamp for the function event and an end timestamp for the function event, wherein the duration is a time difference between said enter timestamp and said end timestamp, the enter timestamp is generated and recorded;

comparing said duration with a predetermined threshold value to determine if said duration exceeds said predetermined threshold value; and if the duration is less than the predetermined threshold value, then the collected runtime information is discarded;

if the duration is equal to or greater than the predetermined threshold value, then a function event type is determined and the collected runtime information is processed, wherein processing includes, collecting the runtime information about said function event based on the function event type, and adding the runtime information to a list of resource calls for application level actions, wherein said application level actions include at least one of a Web page request, a web service call, handler event for a user interface control or an application function and wherein said runtime information includes at least one of a value of a function parameter, a value of an object member variable, wherein said function event type includes at least one of a Resource Interface Call function type and an Application Level Action function type.

15. The system of claim 14, wherein said predetermined platform is at least one of a .NET framework, a J2EE, a J2SE and a J2ME platform.

16. A computer readable storage medium including computer-executable instructions which when executed by a processor causes a controller of a computer to implement a method for collecting runtime information generated by an active software application, the method comprising:

identifying on the computer an occurrence of a function event generated for a software application operating on a predetermined platform;

collecting on the computer the runtime information generated by the active software application responsive to said function event, wherein collecting includes:

determining a duration of said function event by calculating the duration using an enter timestamp for the function event and an end timestamp for the function event, wherein the duration is a time difference between said enter timestamp and said end timestamp wherein the enter timestamp are generated and recorded;

comparing said duration with a predetermined threshold value to determine if said duration exceeds said predetermined threshold value; and if the duration is less than the predetermined threshold value, then the collected runtime information is discarded;

if the duration is equal to or greater than the predetermined threshold value, then a function event type is determined and the collected runtime information is processed, wherein processing includes, collecting the runtime information about said function event based on the function event type, and adding the runtime information to a list of resource calls for application level actions, wherein said application level actions include at least one of a Web page request, a web service call, a handler event for a user interface control or an application function and wherein said runtime information includes at least one of a value of a function parameter, a value of an object member variable, wherein said function event type includes at least one of a Resource Interface Call function type and an Application Level Action function type.

\* \* \* \* \*